US012513386B2

(12) United States Patent
Tille

(10) Patent No.: US 12,513,386 B2
(45) Date of Patent: Dec. 30, 2025

(54) METHOD AND DEVICE FOR GENERATING A COMPOSITE IMAGE OF A SAMPLE

(71) Applicant: LEICA MICROSYSTEMS CMS GMBH, Wetzlar (DE)

(72) Inventor: Sebastian Tille, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 46 days.

(21) Appl. No.: 18/420,863

(22) Filed: Jan. 24, 2024

(65) Prior Publication Data

US 2024/0251151 A1 Jul. 25, 2024

(30) Foreign Application Priority Data

Jan. 25, 2023 (DE) .......................... 102023101782.9

(51) Int. Cl.
*H04N 23/56* (2023.01)
*G02B 21/00* (2006.01)
*H04N 5/265* (2006.01)

(52) U.S. Cl.
CPC ......... *H04N 23/56* (2023.01); *G02B 21/0032* (2013.01); *G02B 21/008* (2013.01); *H04N 5/265* (2013.01)

(58) Field of Classification Search
CPC .... H04N 23/56; H04N 5/265; G02B 21/0032; G02B 21/008; G02B 21/0036;

(Continued)

(56) References Cited

U.S. PATENT DOCUMENTS

2002/0027709 A1 3/2002 Engelhardt et al.
2003/0202233 A1 10/2003 Sandstrom
(Continued)

FOREIGN PATENT DOCUMENTS

CN 113689332 A 11/2021
DE 10043992 A1 3/2002
(Continued)

OTHER PUBLICATIONS

Peng et al. "A BaSiC tool for background and shading correction of optical microscopy images," Nat Commun 8, 14836 (2017), Jun. 8, 2017, pp. 1-7, Nature Publishing Group, UK.

*Primary Examiner* — Nasim N Nirjhar
(74) *Attorney, Agent, or Firm* — LEYDIG, VOIT & MAYER, LTD.

(57) ABSTRACT

A device for generating a composite image of a sample includes an illumination unit configured to generate illumination light for illuminating the sample, and an image capture unit configured to generate a first individual image of the sample and a second individual image of the sample. The first individual image corresponds to a first sample region. The second individual image corresponds to a second sample region that is different from the first sample region and overlaps with the first sample region in an overlap region. The device further includes a control unit configured to control the illumination unit in such a way that, when generating each of the first individual image and the second individual image, at least the overlap region is illuminated with a lower intensity of the illumination light than a remaining portion of the first sample region and a remaining portion of the second sample region.

13 Claims, 7 Drawing Sheets

(58) Field of Classification Search
CPC ..... G02B 21/367; G02F 1/11; G01N 21/6458; G05D 25/02
See application file for complete search history.

(56) References Cited

U.S. PATENT DOCUMENTS

| | | |
|---|---|---|
| 2006/0023217 A1 | 2/2006 | Bangalore et al. |
| 2010/0150472 A1 | 6/2010 | Chen |
| 2011/0285838 A1* | 11/2011 | Kishima .............. H04N 1/3876 348/79 |
| 2016/0299326 A1 | 10/2016 | Eggert et al. |
| 2019/0278072 A1* | 9/2019 | Fahrbach ............... G02B 21/16 |
| 2022/0043246 A1 | 2/2022 | Anhut et al. |
| 2023/0084030 A1* | 3/2023 | Samadani .............. H04N 23/74 348/69 |
| 2023/0144705 A1* | 5/2023 | Martins Loureiro ........................ H10H 29/142 362/555 |

FOREIGN PATENT DOCUMENTS

| | | |
|---|---|---|
| DE | 10145221 A1 | 4/2003 |
| DE | 69928232 T2 | 8/2006 |
| DE | 102005024066 A1 | 12/2006 |
| DE | 102013016367 A1 | 4/2015 |
| DE | 102013021482 A1 | 6/2015 |
| DE | 102020209889 A1 | 2/2022 |

\* cited by examiner

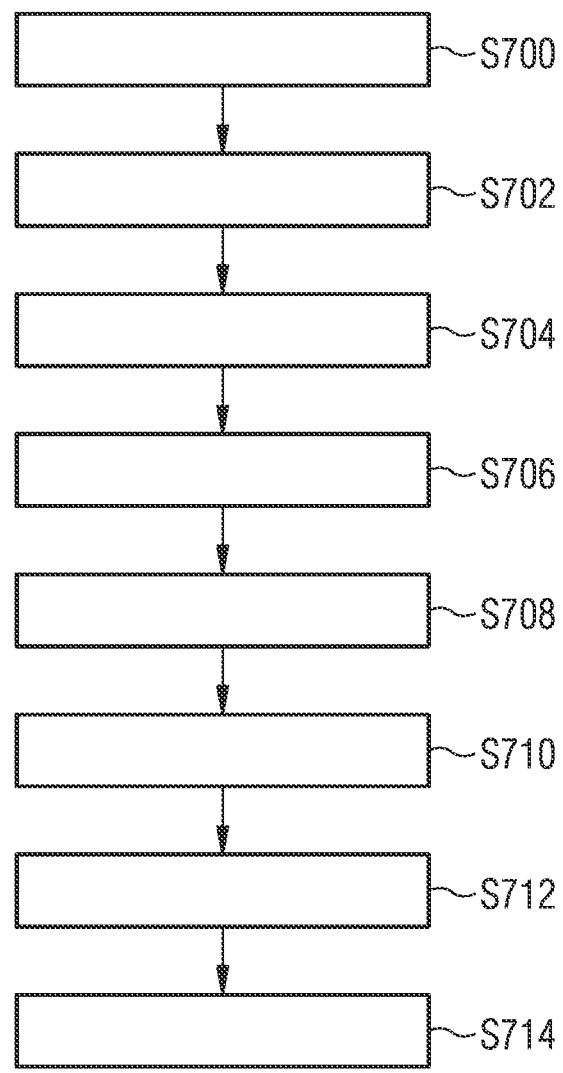

METHOD AND DEVICE FOR GENERATING A COMPOSITE IMAGE OF A SAMPLE

CROSS REFERENCE TO RELATED APPLICATIONS

This application claims benefit to German Patent Application No. DE 102023101782.9, filed on Jan. 25, 2023, which is hereby incorporated by reference herein.

FIELD

Embodiments of the present invention relate to a device for generating a composite image of a sample, and to a method for generating a composite image of a sample.

BACKGROUND

Stitching is a technique for generating images that are larger than a single field of view of an image-generating device such as a microscope. In this technique, a sample is moved relative to an optical system of the image-generating device to generate a plurality of individual images which overlap in sub-regions. These sub-regions will hereinafter be referred to as "overlap regions." Alternatively, the optical system of the image-generating device may be moved relative to the sample. The best overlay of the overlap regions of the individual images is determined algorithmically in order to create a single larger composite image, also called a mosaic image, for subsequent processing, viewing, and/or analysis. In this process, the overlap regions of adjacent individual images are compared, and identical structures are identified in the examined overlap regions of adjacent individual images. Then, the adjacent individual images are assembled, and the respective overlap regions are overlaid by combining the overlapping pixels from each of the overlap regions based on the identified structures using a mathematical formula.

Typical problems with stitching are so-called "stitching artifacts." Such artifacts can be, for example, ghost or double images of features in the overlap regions, caused, for example, by optical or mechanical tolerances or non-linearities. Even if the stitching is precise and the corresponding pixels of the individual images overlap perfectly, artifacts can still occur in the overlap regions after combining the pixels of the partial images if the pixel intensities in the overlap regions differ from the pixel intensities in the non-overlap regions. In composite images, the overlap regions are often clearly visible due to the different intensities.

The artifacts produced during stitching are typically removed in post-processing, for example using the algorithm described by Peng et al. in "A BaSiC tool for background and shading correction of optical microscopy images" Nat Commun 8, 14836 (2017)—https://doi.org/10.1038/ncomms14836. The problem with such algorithms, however, is that they change the intensity of the pixels of the seams in the composite image, which subsequently no longer allows quantitative statements to be made about these pixels.

Moreover, multiple exposure of the overlap regions to illumination leads to increased bleaching of the sample in these regions and virtually results in a grid pattern being stamped into the sample, which produces additional artifacts in the case of repeated image acquisition if the individual images are not captured precisely at identical positions. Such artifacts are then very difficult to correct through post-processing.

SUMMARY

Embodiments of the present invention provide a device for generating a composite image of a sample includes. The device includes an illumination unit configured to generate illumination light for illuminating the sample, and an image capture unit configured to generate a first individual image of the sample and a second individual image of the sample. The first individual image corresponds to a first sample region. The second individual image corresponds to a second sample region that is different from the first sample region and overlaps with the first sample region in an overlap region. The device further includes a control unit configured to control the illumination unit in such a way that, when generating each of the first individual image and the second individual image, at least the overlap region is illuminated with a lower intensity of the illumination light than a remaining portion of the first sample region and a remaining portion of the second sample region.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 7 shows a flow chart of a method for generating a composite image of a sample, according to some embodiments.

DETAILED DESCRIPTION

Figure 1:
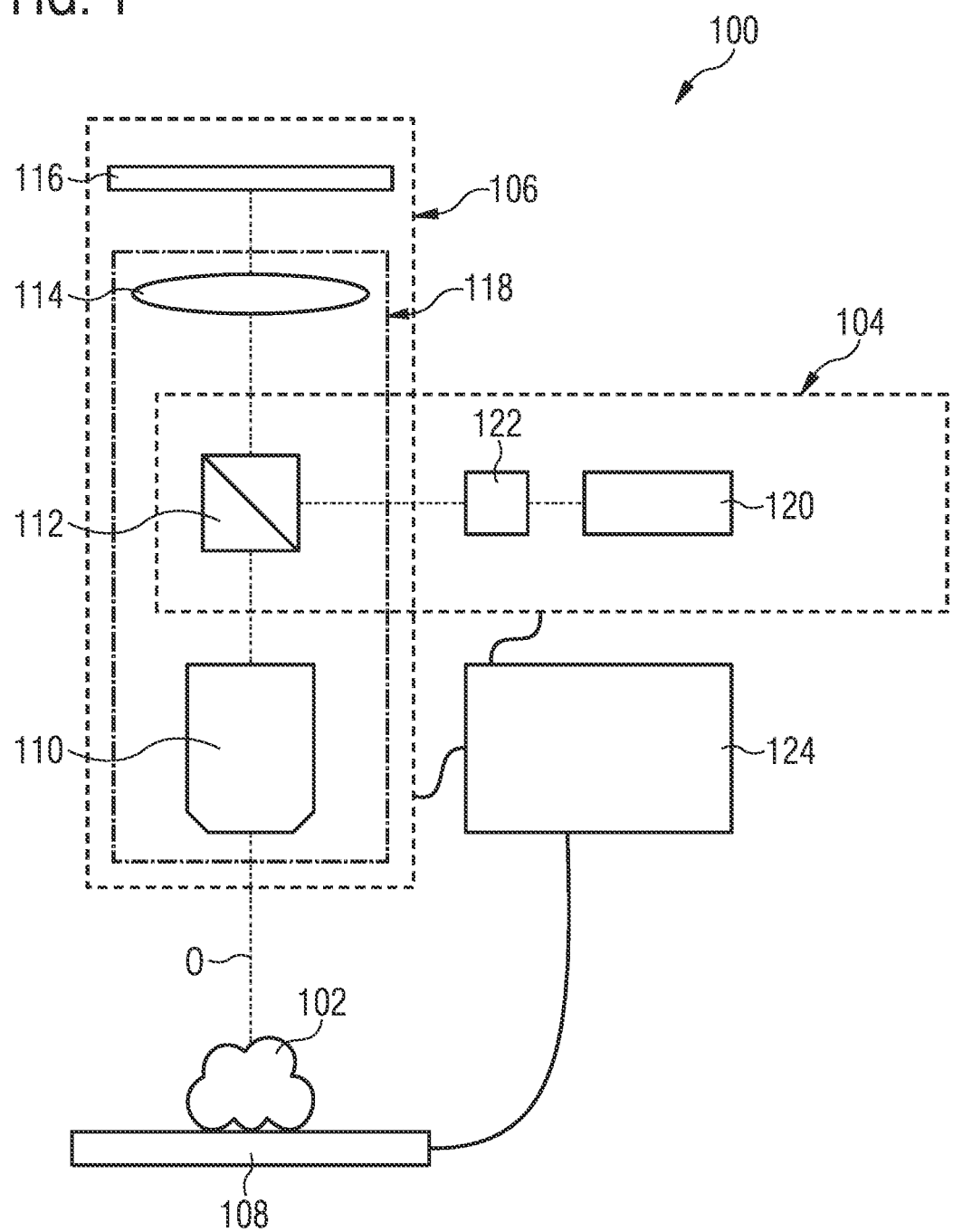
FIG. 1 shows a device for generating a composite image of a sample according to an exemplary embodiment.

Embodiments of the present invention provide a device and method for generating a composite image that allows a plurality of overlapping individual images to be assembled into one image and overcomes the aforementioned problems of the prior art.

According to some embodiments, the device for generating a composite image of a sample includes an illumination unit configured to generate illumination light for illuminating the sample and an image capture unit configured to generate a first individual image of the sample and at least a second individual image of the sample. The first individual image corresponds to a first sample region, and the second individual image corresponds to a second sample region that is different from the first sample region and overlaps with the first sample region in an overlap region. The device further includes a control unit configured to control the illumination unit in such a way that when generating the first individual image and the second individual image, at least the overlap region is in each case illuminated with illumination light of a lower intensity than the remaining first sample region and the remaining second sample region.

The first individual image and the second individual image can be assembled into a composite image of the sample. This composite image covers the first sample region and the second sample region. This makes it possible, in particular, to generate images that show an area of the sample larger than the field of view of the image capture unit. Illuminating the overlap region with the lower intensity avoids stitching artifacts in the composite image or at least greatly reduces their effect. Since the overlap region is in each case illuminated with the lower intensity, the cumulative intensity with which the overlap region is illuminated during generation of the two individual images can be selected such that the cumulative intensity corresponds to the intensity with which the remaining first sample region and the remaining second sample region, i.e. the non-overlap sample regions, are illuminated, respectively. During generation of the two individual images, all regions of the sample are thus illuminated with the same intensity and no noticeable stitching artifacts are produced, for example due to bleaching of the sample, especially in the case of fluorescence-labeled samples. Thus, the proposed device avoids stitching artifacts in real time instead of removing them later in post-processing. This makes it possible, in particular, to perform imaging experiments in which a plurality of individual images have to be assembled for documentation or quantification purposes. In addition, this also allows for repeated capture of composite images of sample regions that have already been imaged, for example, after optimizing imaging parameters or the imaging area or during the acquisition of image series over time. Since no post-processing is performed in which the intensity of individual pixels of the two individual images is changed, the proposed device in particular also allows quantitative evaluations of image regions of the composite image.

In an embodiment, the illumination unit is configured to generate a structured illumination with a spatially modulated intensity pattern. The structured illumination is spatially modulated in such a way that at least the overlap region is illuminated with illumination light of the lower intensity. In this embodiment, the illumination unit is configured to generate a planar illumination in the form of the spatially modulated intensity pattern. Such planar illumination allows in particular wide-field imaging, where either the entire field of view or at least a large part of the field of view of the image capture unit is illuminated and imaged at once.

In another embodiment, the illumination unit includes a light source for generating the illumination light and a light modulation unit disposed downstream of the light source and configured to generate the structured illumination with the spatially modulated intensity pattern from the illumination light. The structured illumination can be generated easily with the aid of the light modulation unit. In particular, the light modulation unit may also be configured such that the light modulation unit can be removed from an illumination beam path of the illumination unit in order to generate a homogeneous illumination. This makes the device even more flexible.

In an alternative embodiment, the illumination unit includes a light source configured to generate a structured illumination with the spatially modulated intensity pattern. For example, the light source itself may include a plurality of point light sources arranged on a grid, for example, an LED array or laser diode array. In this embodiment, the structured illumination can be generated easily.

In a further embodiment, the light modulation unit includes a controllable spatial light modulator. The control unit may be configured to control the light modulation unit to generate the structured illumination in such a way that at least the overlap region is illuminated with illumination light of the lower intensity. Controllable spatial light modulators are also known by the acronym SLM. With the aid of the controllable spatial light modulator, the planar illumination of the sample can be generated flexibly and thus easily adapted to the geometry of the overlap region. This makes the device versatile to use.

In a further embodiment, the controllable spatial light modulator includes a micromirror array and/or a liquid crystal element. Micromirror arrays are also referred to as micromirror actuators, digital micromirror devices, or DMD for short. The liquid crystal element may in particular be a controllable shutter formed by a liquid crystal. The micromirror array and the liquid crystal element are common optical elements, which generate the spatially modulated intensity pattern by reflection or transmission of the illumination light, respectively. The use of common optical components can reduce the effort required to manufacture the device.

In another embodiment, the light modulation unit includes a patterned optical filter having at least one semitransparent region. The semitransparent region may be arranged such that at least the overlap region is illuminated with illumination light of the lower intensity. In this embodiment, the structured illumination is generated with the aid of the optical filter. The patterned optical filter is a passive optical element; i.e. it is not controlled. This reduces the complexity of the device. Furthermore, passive optical elements are less expensive than their active counterparts. This also reduces the manufacturing cost of the device.

As an alternative to the patterned optical filter, the light modulation unit may also include a mirror having a patterned coating. The patterned coating changes the reflectivity of the mirror in certain regions, whereby the spatially modulated intensity pattern is generated when the illumination light is shone on the mirror. In other words, while the patterned optical filter generates the spatially modulated intensity pattern from the illumination light by transmission, the mirror generates the spatially modulated intensity pattern from the illumination light by reflection. The mirror is also a passive optical element with the above-mentioned advantages.

In a further embodiment, the illumination unit includes a first light source for generating the illumination light, at least a second light source for generating the illumination light of the low intensity, and a fiber bundle. The fiber bundle is configured to receive the illumination light and the illumination light of the low intensity and to direct it to the sample in such a way that at least the overlap region is illuminated with illumination light of the lower intensity. In this embodiment, the generated illumination light is almost entirely used to illuminate the sample; i.e., no illumination light is filtered out or deflected into a beam trap to produce the illumination light with the low intensity. This can be efficient.

In another embodiment, the illumination unit includes a light source for generating the illumination light and an attenuation unit disposed downstream of the light source and configured to reduce the intensity of the illumination light. Especially in the case of scanning illumination, the intensity of the illumination needs to be reduced to the lower intensity whenever the illumination scans the overlap region. This can advantageously be accomplished using the attenuation unit disposed downstream of the light source. When using the attenuation unit, the light source can be operated with the same intensity throughout the illumination, which is more efficient for certain light sources than controlling the intensity of the light source itself. In particular, depending on the light source, using the attenuation unit to reduce the intensity may be faster than controlling the light source itself.

In a further embodiment, the attenuation unit includes one of the following optical elements: an acoustic-optic tunable filter, an acoustic-optic modulator, an electric-optic modulator, or a Pockels cell. Acoustic-optic tunable filters are also referred to as acousto-optic tunable filters, or AOTF for short. Acoustic-optic modulators are also referred to in short as AOM. Electric-optic modulators are also referred to in short as EOM. The optical elements mentioned above allow the intensity of the illumination light to be controlled, i.e., in particular reduced quickly. For example, Pockels cells can be switched in nanoseconds. Consequently, the scanning speed of the illumination can be significantly increased when one of these optical elements is used to reduce the intensity of the illumination light.

In another embodiment, the illumination unit includes a light source for generating the illumination light, the light source being controllable to control the intensity of the illumination light. The controllable light source is, for example, a laser diode or an LED. Alternatively or in addition to reducing the intensity of the illumination light by means of the attenuation unit, it is also possible to control the light source itself to reduce the illumination intensity to the lower intensity during illumination of the overlap region. Especially with diode-based light sources, the intensity can be reduced very quickly. Omitting the attenuation unit reduces the complexity of the device, making it easier to manufacture and handle.

In a further embodiment, the device includes a scanning unit disposed downstream of the illumination unit and configured to deflect the illumination light for generating a scanning illumination. The control unit may be configured to control the scanning unit in such a way that the first sample region is scanned point by point or line by line by the illumination light to generate the first individual image and the second sample region is scanned point by point or line by line by the illumination light to generate the second individual image, and to control the illumination unit in such a way that the intensity of the illumination light is reduced to the lower intensity at least for illuminating the overlap region. In this embodiment, the illumination unit is configured to implement the scanning illumination, where the sample is scanned point by point or line by line by the illumination light. Whenever the scanning illumination scans a point or a line of the overlap region, the control unit controls the illumination unit in such a way that it reduces the intensity of the illumination light to the lower intensity. This can be done, for example, using the attenuation unit and/or the illumination unit reduces the intensity of the light source. The scanning illumination allows the device, for example, to be used for confocal microscopy or multi-photon microscopy.

In another embodiment, the illumination unit is configured to generate a light-sheet-type illumination light distribution in the sample. In light sheet microscopy, the sample is illuminated with the light-sheet-type illumination light distribution. With this illumination light distribution, it is possible to illuminate a very thin layer, typically a few micrometers thick, of the sample. This makes it possible to achieve a high resolution along the optical axis. It is also possible to illuminate a plurality of superimposed layers of the sample and to assemble them into a volumetric image of the sample.

In a further embodiment, the device includes a motorized microscope stage configured to hold the sample. The control unit may be configured to move the microscope stage for generating the first individual image in such a way that the first sample region is in a field of view of the image capture unit and to move it for generating the second individual image in such a way that the second sample region is in the field of view of the image capture unit. Using the motorized microscope stage, the sample can be positioned very precisely in the field of view of the image capture unit. This makes it easier to later assemble the two individual images into the composite image of the sample. The motorized microscope stage also makes it possible to substantially automate the generation of the two individual images.

In a further embodiment, the illumination unit is configured to generate illumination light for exciting fluorophores present in the sample. In particular, the illumination unit may be configured to generate laser light as the illumination light. In this embodiment, the device may in particular be configured as a fluorescence microscope. Fluorescence microscopy allows sample structures stained with fluorophores to be resolved with high precision.

In another embodiment, the image capture unit includes a sensor element and an optical system configured to direct the illumination light to the sample and to direct the detection light emanating from the sample to the sensor element. The sensor element may in particular be an area sensor configured to generate a two-dimensional image of the sample from the detection light, such as, for example, a CCD camera, a CMOS camera, or sCMOS camera, or a point detector array (PMT or SPAD array). Alternatively, the sensor element may also be a point detector or line detector configured to generate from the detection light a single image point or a single image line of a two-dimensional image of the sample. Such point detectors and line detectors are used in particular in confocal microscopy.

In a further embodiment, the image capture unit includes an optical system. The optical system includes at least one microscope objective pointing at the sample and constitutes a microscope. In particular, the optical system includes a single microscope objective pointing at the sample. In this embodiment, the device is configured in particular as a light sheet microscope, where the illumination unit is configured to generate a light-sheet-type illumination light distribution in the sample. The single microscope objective is used to direct the illumination light or the light sheet formed from the illumination light to the sample, and to receive the detection light emanating from the sample and direct it to the sensor element.

In another embodiment, the image capture unit is configured to generate at least a third individual image of the sample. The third individual image corresponds to a third sample region that is different from the first sample region and the second sample region and overlaps with the first sample region and the second sample region in a further overlap region. The control unit may be configured to control the illumination unit in such a way that when generating the first individual image, the second individual image, and the third individual image, at least the further overlap region is in each case illuminated with illumination light of an even lower intensity than the overlap region. In this embodiment, all three individual images overlap in the further overlap region. In order to prevent the sample from being bleached by triple exposure of the further overlap region to illumination, the further overlap region is in each case illuminated with the even lower intensity. The even lower intensity is preferably selected such that the cumulative intensity with which the further overlap region is illuminated in the course of generating the three individual images corresponds to the intensity with which the remaining first sample region, the remaining second sample region, and the remaining third sample region are illuminated, respectively. In this way, the composite image of the sample can be generated from the three individual images, which show an area of the sample larger than the field of view of the image capture unit, and in which stitching artifacts are avoided or the effect thereof is at least greatly reduced.

In another embodiment, the control unit is configured to process first image data corresponding to the first individual image and second image data corresponding to the second individual image to generate the composite image of the sample, which includes an image of the first sample region and an image of the second sample region. The image data is generated, for example, by the image capture unit. In this embodiment, the control unit is configured to generate a composite image of the sample. For this purpose, the control unit is in particular configured to identify identical elements in the two individual images based on the first image data and the second image data. The control unit can then register the two individual images based on the identical elements in the two individual images. This can be done in particular using known methods. In this embodiment, the composite image of the sample can be generated in a substantially automated manner.

Embodiments of the invention also relate to a method for generating a composite image of a sample. In this method, a first individual image of the sample is generated that corresponds to a first sample region. at least a second individual image of the sample is generated that corresponds to a second sample region that is different from the first sample region and overlaps with the first sample region in an overlap region. Moreover, when generating the first individual image and the second individual image, at least the overlap region is in each case illuminated with illumination light of a lower intensity than the remaining first sample region and the remaining second sample region. The proposed method has the same advantages as the device described above and can be refined in particular with the features of the dependent claims directed to the device. Conversely, the device can also be refined with the features of the dependent claim directed to the method.

In an embodiment, the method includes a calibration step for determining the lower intensity. The value of the lower intensity can be determined such that the intensity of detection light that emanates from the sample during exposure to illumination light of the lower intensity is half as great as during exposure to illumination light of a normal intensity with which the remaining first sample region and the remaining second sample region are illuminated. Similarly to the lower intensity, the even lower intensity can also be determined in the calibration step. "The detection light that emanates from the sample" means in particular fluorescent light emanating from the sample. The control unit of the device described above may be configured to perform the calibration step by controlling the illumination unit and the image capture unit. In a regime where the intensity of the detection light is linear to the intensity of the illumination light, the low intensity can be selected as half the normal intensity. When used in fluorescence microscopy, the detection light, i.e. the fluorescence response, is usually non-linear. This is why the calibration step is required. The calibration step ensures that the cumulative intensity of the detection light that emanates from the overlap region, i.e., the intensity of the detection light summed during the capture of the two individual images, is comparable to the intensity of the detection light that emanates from the remaining sample regions. In particular, the calibration step can be performed by illuminating a region of the sample with illumination light of different intensities and in each case storing the intensity of the detection light as calibration data. A correlation between the intensity of the illumination light and the intensity of the detection light can then be determined from the calibration data, for example by fitting the calibration data to a functional relationship or by interpolating the calibration data.

Further features and advantages will become apparent from the following description, which, together with the accompanying figures, illustrates exemplary embodiments in greater detail.

FIG. 1 shows in schematic form a device 100 for generating a composite image of a sample 102 according to an exemplary embodiment.

Purely by way of example, the device 100 shown in FIG. 1 takes the form a wide-field microscope with incident light illumination, including an illumination unit 104, an image capture unit 106, and a microscope stage 108. Image capture unit 106 includes a single microscope objective 110 pointing at sample 102 and configured to receive detection light emanating from sample 102 and direct it to a beam splitter 112 of device 100. The detection light received by microscope objective 110 is directed by beam splitter 112 to a tube lens 114, which focuses the detection light onto a sensor element 116. Microscope objective 110, beam splitter 112, and tube lens 114 are part of an optical system 118 of device 100, which directs the detection light onto sensor element 116 to produce images of sample 102.

Microscope stage 108 is movable by motor means at least in a plane perpendicular to the optical axis O of microscope objective 110. By moving sample 102 relative to microscope objective 110, different sample regions 600, 602 (see FIG. 6) can be brought into the field of view of image capture unit 106. In particular, by moving sample 102 relative to microscope objective 110, a first individual image of sample 102 can be generated that corresponds to a first sample region 600, and at least a second individual image of sample 102 can be generated that corresponds to a second sample region 602 that is different from first sample region 600 and overlaps with first sample region 600 in an overlap region 402, 604 (see FIGS. 4a and 6). Further individual images may also be generated, for example, a third individual image corresponding to a third sample region that is different from first sample region 600 and second sample region 602 and overlaps with first sample region 600 and second sample region 602 in a further overlap region 404 (see FIG. 4b). The individual images can then be combined into an image of sample 102 that depicts an area of sample 102 larger than the field of view of image capture unit 106.

Illumination unit 104 includes a light source 120 configured to generate illumination light for illuminating sample 102. Illumination unit 104 further includes a light modulation unit 122 disposed downstream of light source 120. Light modulation unit 122 is configured to generate from the illumination light a structured illumination 400, 406 (see FIGS. 4a and 4b) with a spatially modulated intensity pattern. Structured illumination 400, 406 is deflected by beam splitter 112 toward microscope objective 110 and projected by microscope objective 110 onto sample 102 to illuminate sample 102.

Structured illumination 400, 406 is spatially modulated in such a way that at least the overlap region 402, 604 is illuminated with illumination light of a lower intensity than the remaining first sample region and the remaining second sample region. An exemplary structured illumination 400 of sample 102 during the capture of the two individual images is described in more detail below with reference to FIG. 4a. When more than two individual images are generated, structured illumination 406 is modulated in such a way that that when generating the first individual image, the second individual image, and the third individual image, at least the further overlap region 404 is in each case illuminated with illumination light of an even lower intensity than overlap region 402, 604. An example of a structured illumination 406 of sample 102 during the capture of the more than two individual images is described in more detail below with reference to FIG. 4b.

When generating the individual images, overlap regions 402, 404, 604 are illuminated multiple times. This may cause bleaching of sample 102 in overlap regions 402, 404, 604. Since overlap regions 402, 404, 604 are illuminated with the lower intensity or the even lower intensity, respectively, bleaching is prevented. This avoids bleaching-induced artifacts in the composite image.

Light modulation unit 122 may include different passive or active optical elements which generate the structured illumination from the illumination light either by transmission or reflection. For example, light modulation unit 122 may include a patterned optical filter or a controllable spatial light modulator operating in transmission, such as, for example, a liquid crystal element. Examples of optical elements that operate in reflection and may be part of light modulation unit 122 include a mirror with a patterned coating or a controllable micromirror array.

Device 100 further includes a control unit 124 configured to control illumination unit 104, image capture unit 106, and microscope stage 108. Control unit 124 is further configured to perform a method for generating the composite image of sample 102. In this method, control unit 124 controls image capture unit 106 and microscope stage 108 in such a way that the first individual image of sample 102 and at least the second individual image of sample 102 are generated. Furthermore, control unit 124 controls illumination unit 104 in such a way that when generating the first individual image and the second individual image, at least the overlap region 402, 604 is in each case illuminated with illumination light of the lower intensity. The method is described in more detail below with reference to FIG. 7.

Figure 2:
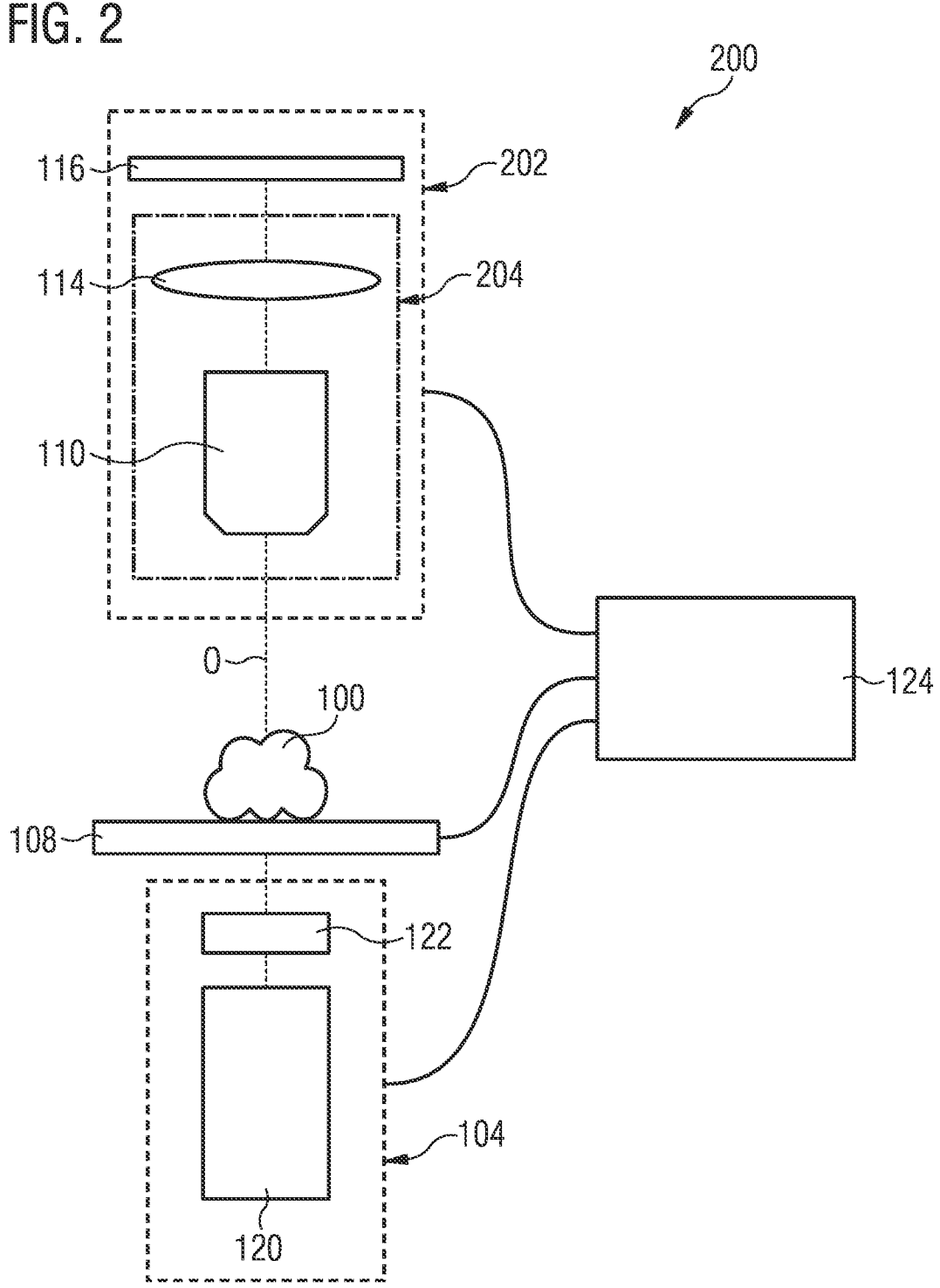
FIG. 2 shows a device for generating a composite image of the sample according to another exemplary embodiment.

FIG. 2 shows in schematic form a device 200 for generating a composite image of sample 102 according to another exemplary embodiment.

The device 200 according to FIG. 2 differs from the device 100 according to FIG. 1 in that the device 200 according to FIG. 2 is configured as a transmitted-light microscope. In this embodiment, illumination unit 104 is disposed below microscope stage 108, so that sample 102 is illuminated from below with structured illumination 400, 406. Image capture unit 202 is disposed above microscope stage 108. The arrangement of illumination unit 104 and image capture unit 106 makes the device 200 of FIG. 2 an upright microscope. The arrangement of illumination unit 104 and image capture unit 106 may also be reversed so that an inverted microscope is formed. The optical system 204 of device 200 does not have the beam splitter 112.

Figure 3:
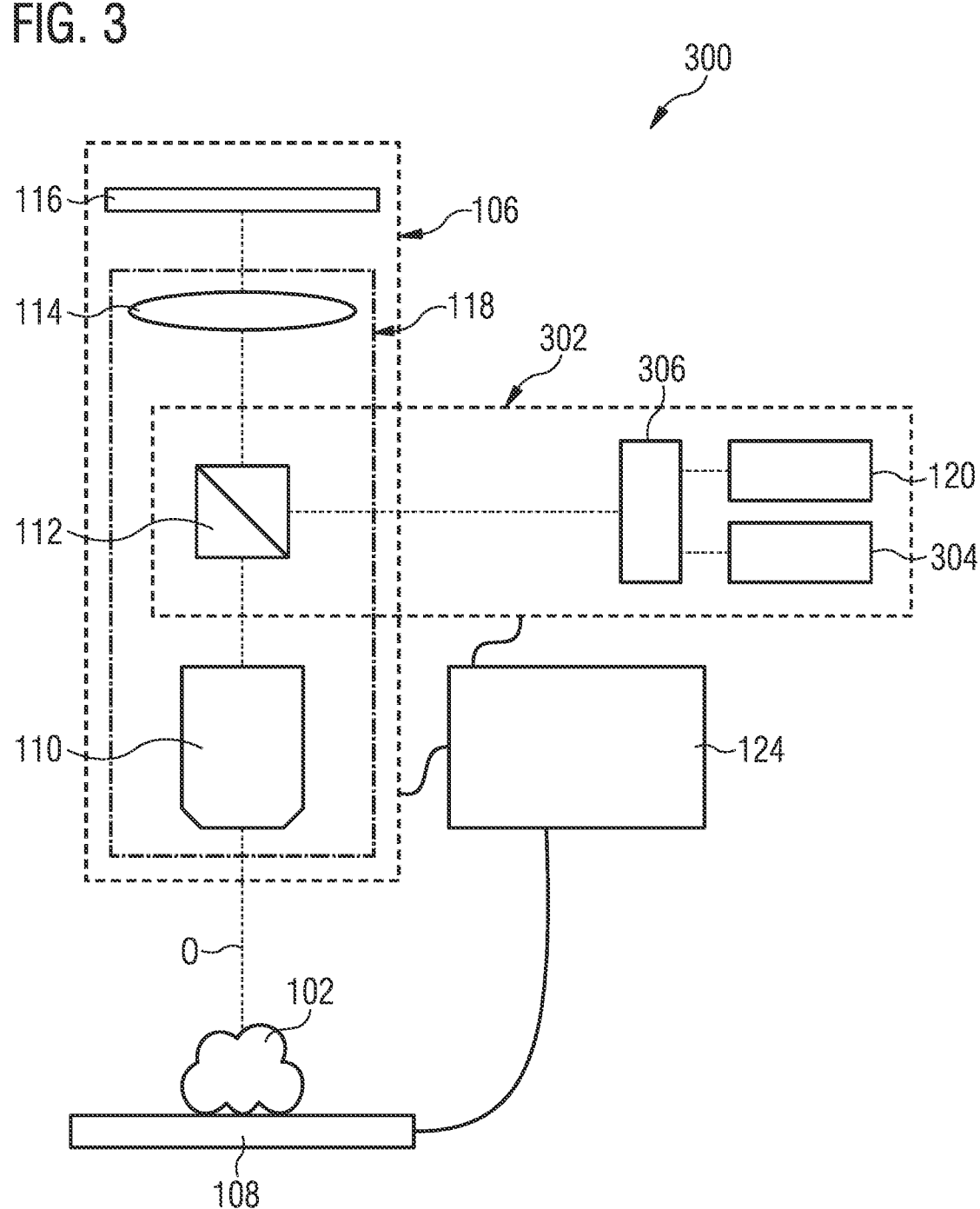
FIG. 3 shows a device for generating a composite image of the sample according to another exemplary embodiment.

FIG. 3 shows in schematic form a device 300 for generating a composite image of sample 102 according to another exemplary embodiment.

The device 300 according to FIG. 3 differs from the device 100 according to FIG. 1 in that illumination unit 302 includes a second light source 304 configured to generate the illumination light with the lower intensity. Illumination unit 302 further includes a fiber bundle 304 disposed downstream of light sources 120, 302 and configured to receive the illumination light with a normal (i.e., unreduced) intensity from first light source 120 and the illumination light with the lower intensity from second light source 304, and to form the structured illumination 400 therefrom. The fiber bundle 306 then directs structured illumination 400 onto beam splitter 112.

Figure 4B:
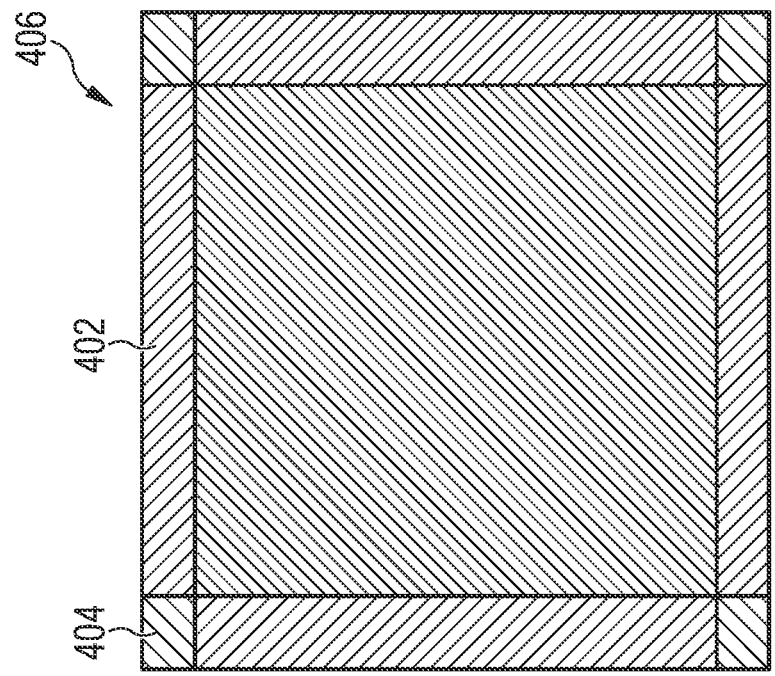
FIG. 4b shows an exemplary structured illumination for capturing more than two individual images using any of the devices of FIG. 1, 2, or 3, according to some embodiments.
Figure 4A:
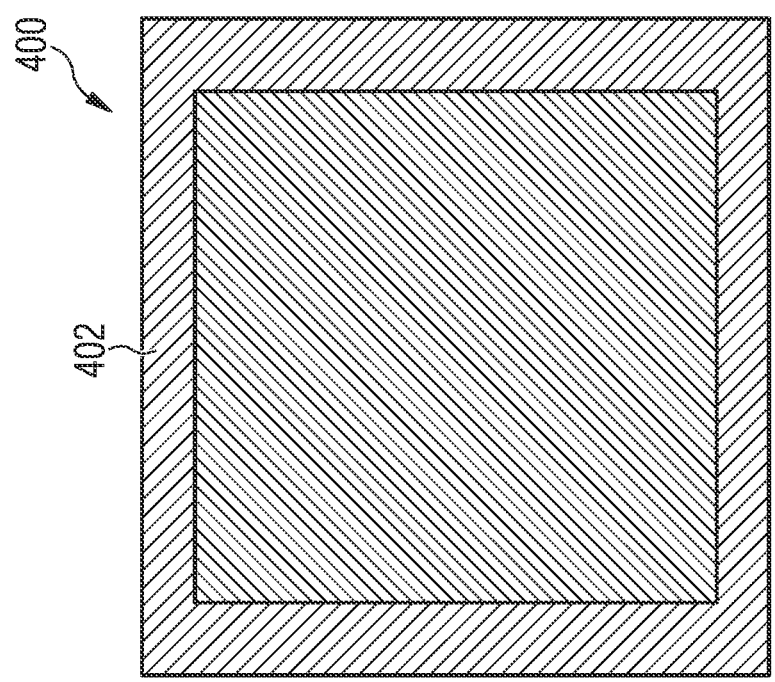
FIG. 4a shows an exemplary structured illumination for capturing two individual images using any of the devices of FIG. 1, 2, or 3, according to some embodiments.

FIGS. 4a and 4b each show in schematic form examples of the structured illumination 400, 406 of sample 102 during the capture of the individual images using any of the devices 100, 200, 400 of FIGS. 1, 2, and 3.

All of the devices 100, 200, 400 shown in FIGS. 1, 2, and 3 are wide-field microscopes, which means that during image generation, the entire field of view or at least a large part of the field of view is illuminated and imaged at once. Overlap region 402 or overlap regions 402, 404 are each located at the edge of the field of view. Therefore, the structured illuminations 400, 406 shown in FIGS. 4a and 4b each have vignetting. This means that the intensity at the edge of the field of view is lower than the intensity at the center of the field of view. In FIGS. 4a and 4b, the different intensities are represented by different hatching patterns.

The structured illumination 400 shown in FIG. 4a is used in particular when capturing two overlapping individual images. The structured illumination 400 has a vignetting effect where the edge of the field of view, which corresponds to overlap region 402, is illuminated with illumination light of the lower intensity. The center of the field of view, which corresponds to the remaining first sample region or the remaining second sample region, respectively, is illuminated with illumination light of the normal intensity. The lower intensity at the edge of the field of view is, for example, 50% of the normal intensity at the center of the field of view. The cumulative intensity with which overlap region 402 is illuminated in the course of capturing the two individual images is therefore 100%.

The structured illumination 406 shown in FIG. 4a is used in particular when capturing more than two individual images. The structured illumination 406 according to FIG. 4b differs from the structured illumination 400 according to FIG. 4a in that it has a vignetting effect where the corners of the field of view that correspond to the further overlap region 404 are illuminated with the even lower intensity. The even lower intensity at the edge of the field of view is, for example, 33% or 25% of the normal intensity at the center of the field of view. The cumulative intensity with which the further overlap region is illuminated in the course of capturing three or four individual images is therefore 100% in each case.

Figure 5:
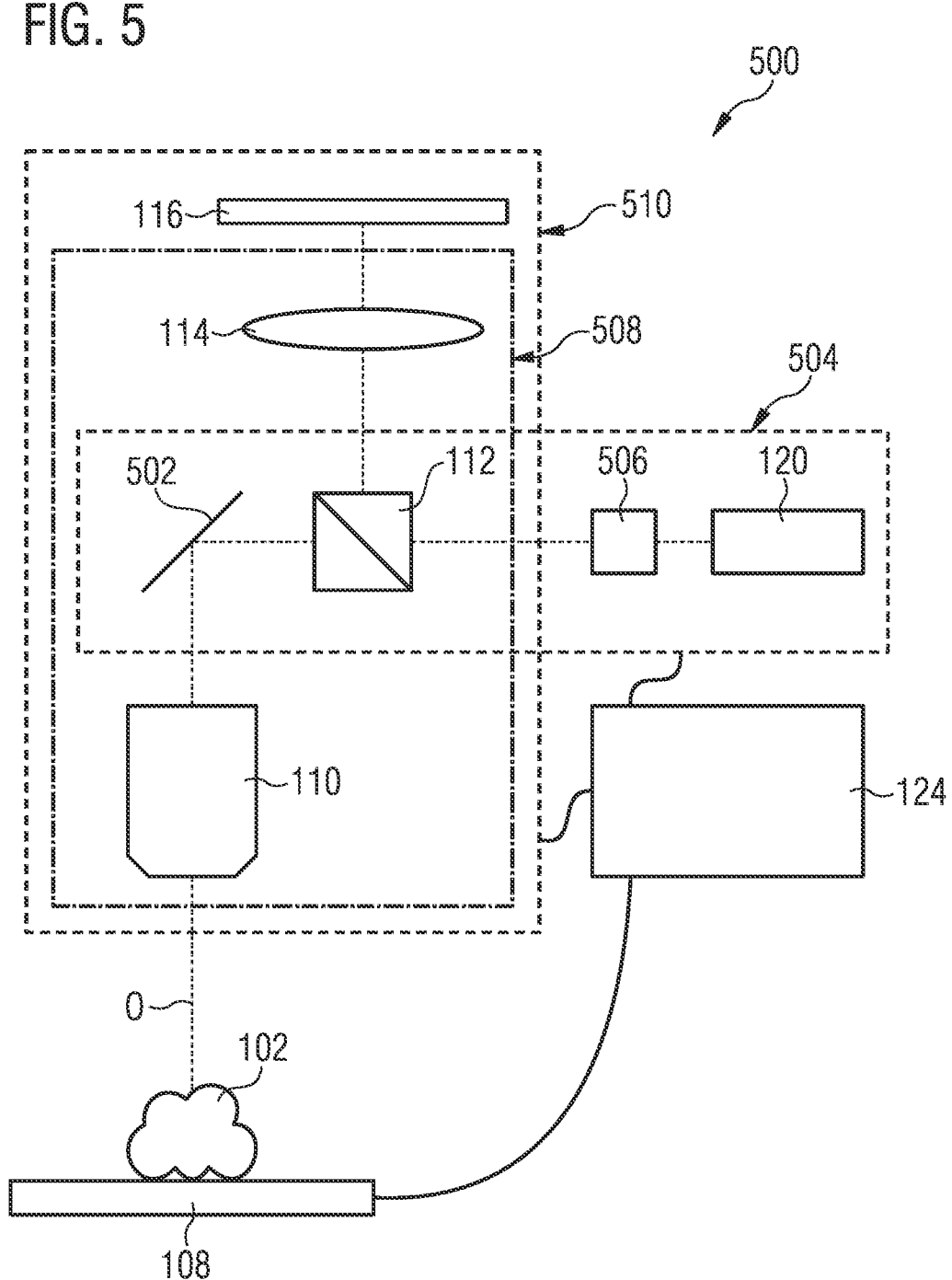
FIG. 5 shows a device for generating a composite image of the sample according to a further exemplary embodiment.

FIG. 5 shows in schematic form a device 500 for generating a composite image of sample 102 according to another exemplary embodiment.

The device 500 according to FIG. 5 differs from the device 100 according to FIG. 1 in that the device 500 according to FIG. 5 is configured as a microscope with scanning illumination. The scanning illumination is realized by means of a scanning unit 502 of illumination unit 504, which, purely by way of example, is disposed between beam splitter 112 and microscope objective 110. The arrangement of scanning unit 502 in FIG. 5 implements a so-called descanned arrangement where the detection light emanating from sample 102 always falls on the same point of sensor element 116. By positioning scanning unit 502 between beam splitter 112 and light source 120, a non-descanned arrangement can be implemented where the detection light emanating from sample 102 during the detection light emanating from sample 102 during scanning of sample 102 with the illumination light falls on different points of sensor element 116. Control unit 506 of device 500 is additionally configured to control illumination unit 504 to realize the scanning illumination.

During scanning illumination, sample 102 is scanned either point by point or line by line by the illumination light. In order to illuminate overlap region 604 (see FIG. 6) with the lower intensity, or further overlap region 404 with the even lower intensity, the illumination light needs to be attenuated whenever the illumination is scanning overlap regions 604, 404. For this purpose, the device 500 according to FIG. 5 has an attenuation unit 506 disposed downstream of light source 120. Attenuation unit 506 is controllable and configured to reduce the intensity of the illumination light when attenuation unit 506 is controlled accordingly. Examples of optical elements that may be part of attenuation unit 506 include acoustic-optic tunable filters, acoustic-optic modulators, electric-optic modulators, or Pockels cells. As an alternative to attenuating the illumination light by means of attenuation unit 506, light source 120 may also be configured to allow control of the intensity of the illumination light generated by light source 120. The illumination of sample 102 with the scanning illumination during generation of the individual images is described in more detail below with reference to FIG. 6.

The illumination unit 504 of the device 500 according to FIG. 5 may in particular be configured to generate a light-sheet-type illumination light distribution. The light-sheet-type illumination light distribution can be produced either statically, i.e., by optics downstream of light source 120, for example a cylindrical lens, or dynamically, i.e., by rapid linear movement of an illumination beam. Optical system 508 of device 500 includes microscope objective 112, scanning unit 502, beam splitter 112, and tube lens 114. Image capture unit 510 of device 500 includes optical system 508 and sensor element 116.

Figure 6:
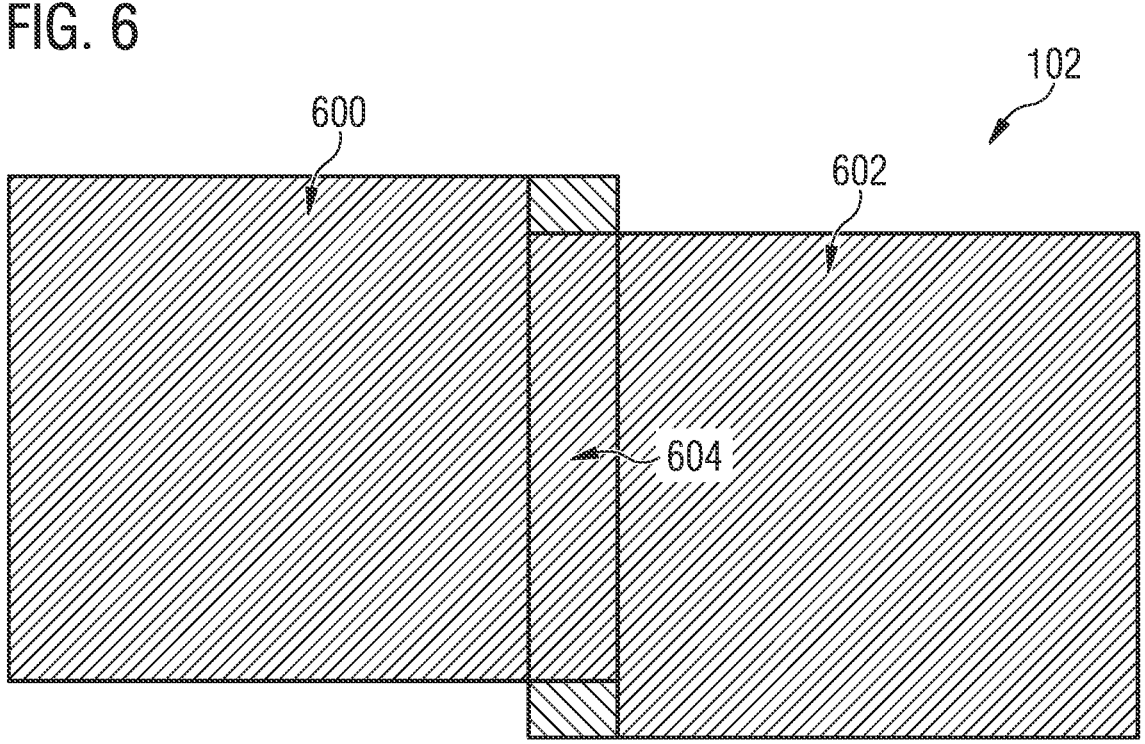
FIG. 6 illustrates a scanning illumination provided by the device of FIG. 5, according to some embodiments.

FIG. 6 shows in schematic form the scanning illumination of sample 102 during the capture of the individual images using the device 500 of FIG. 5.

In FIG. 6, the two sample regions 600, 602 are shown by way of example as two horizontally offset rectangles. First sample region 600 is shown on the left in FIG. 6, and second sample region 602 is shown on the right in FIG. 6. Overlap region 604 is where first sample region 600 and second sample region 602 overlap each other, i.e., at the right edge of first sample region 600 and at the left edge of second sample region 602.

When generating the first individual image, first sample region 600 is scanned with the scanning illumination. This is done, for example, point by point; i.e., at least one illumination spot is formed from the illumination light and used to scan first sample region 600. The scanning illumination can also be performed line by line; i.e. an illumination line is formed from the illumination light, for example by rapid linear movement of an illumination beam, and used to scan first sample region 600 along a direction, for example from left to right in FIG. 6. The scanning illumination can also be realized by the light-sheet-type illumination light distribution, in particular by a dynamically generated light sheet. In the case of illumination with the dynamically generated light sheet, the light propagation direction of the light sheet in FIG. 6 is vertical, i.e., from bottom to top or from top to bottom. When generating the second individual image, second sample region 602 is scanned with the scanning illumination similarly to first sample region 600.

In order for the overlap region 604 to be illuminated with the low intensity in each case, the intensity of the illumination light is reduced to the low intensity whenever the scanning illumination is scanning overlap region 604. In the case of point-by-point illumination, the intensity is reduced to the low intensity while the illumination spot is located in overlap region 604. In the case of line-by-line illumination, the intensity is reduced to the low intensity while the illumination line moves across overlap region 604. In the case of illumination with the dynamically generated light sheet, the intensity is reduced to the low intensity whenever the light beam, which is linearly moved to generate the light sheet, moves across overlap region 604. In FIG. 6, the different intensities are represented by different hatching patterns.

FIG. 6 shows a flow chart of a method for generating a composite image of a sample 102.

The method can be performed in particular using any of the devices 100, 200, 300, 500 described above. In step S700, the method is initiated. In optional step S702, a calibration is performed to determine the value of the low intensity and, where applicable, the value of the even lower intensity. The value of the lower intensity is determined such that the intensity of detection light that emanates from sample 102 during illumination with the lower intensity is half as great as during exposure to illumination light of the normal intensity. The value of the even lower intensity is determined such that when three sample regions overlap each other in the further overlap region 404, the intensity of detection light that emanates from sample 102 during illumination with the even lower intensity is one-third of the intensity during exposure to illumination light of the normal intensity. Similarly, the value of the even lower intensity is determined such that when four sample regions overlap each other in the further overlap region 404, the intensity of detection light that emanates from sample 102 during illumination with the even lower intensity is one-fourth of the intensity during exposure to illumination light of the normal intensity.

In a regime in which the fluorescence response of sample 102 is linear, the lower intensity can be determined as half the normal intensity and the even lower intensity as one-third or one-fourth of the normal intensity, respectively. Outside the linear regime, a calibration measurement needs to be performed in step S702, which can be used to qualitatively determine the fluorescence response of sample 102, for example in the form of a table, an interpolation, or a fitted functional relationship. This calibration measurement can be performed, for example, in a sample region that is not of interest to the actual image generation. Alternatively or additionally, the calibration measurement may also be performed on fluorophores outside the sample 102; i.e., using a test object.

In step S704, control unit 124 controls microscope stage 108 in such a way that first sample region 600 is in the field of view of image capture unit 106. Then, in step S706, the first individual image is generated that corresponds to first sample region 600. In this process, overlap region 402, 604 is illuminated with the illumination light of the lower intensity, and the remaining first sample region is illuminated with the illumination light of the normal intensity. In step S708, control unit 124 controls microscope stage 108 in such a way that second sample region 602 is in the field of view of image capture unit 106. Then, in step S710, the second individual image is generated that corresponds to second sample region 602. In this process, overlap region 402, 604 is illuminated with the illumination light of the lower intensity, and the remaining second sample region is illuminated with the illumination light of the normal intensity.

Steps S708 and S710 may optionally be performed for additional sample regions. If additional sample regions are imaged, control unit 124 controls illumination unit 104, 504 in steps S706 and S710, respectively, in such a way that the additional sample regions, i.e., regions of the sample where three or more sample regions 600, 602 overlap each other, are illuminated with the even lower intensity. In optional step S712, control unit 124 generates image data corresponding to the individual images. Control unit 124 then processes the image data into the composite image of the sample, which covers all imaged sample regions 600, 602. The method is then terminated in step S714.

The term "and/or" includes any and all combinations of one or more of the associated listed items and may be abbreviated as "/".

Although some aspects have been described in the context of a device, it is clear that these aspects also represent a description of the corresponding method, where a block or device corresponds to a method step or a feature of a method step. Analogously, aspects described in the context of a method step also represent a description of a corresponding block or item or feature of a corresponding device.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 100 device
102 sample
104 illumination unit
106 image capture unit
108 microscope stage
110 microscope objective
112 beam splitter
114 tube lens
116 sensor element
118 optical system
120 light source
122 light modulation unit
124 control unit
200 device
202 image capture unit
204 optical system
300 device
302 illumination unit
304 light source
306 fiber bundle
400 structured illumination
402, 404 overlap region
406 structured illumination
500 device
502 scanning unit
504 illumination unit
506 attenuation unit
508 optical system
510 image capture unit
600, 602 sample region
604 overlap region
O optical axis

What is claimed is:

1. A device for generating a composite image of a sample, the device comprising:
   an illumination unit configured to generate illumination light for illuminating the sample, wherein the illumination unit comprises a scanner for scanning the illumination light,
   an image capture unit configured to generate a first individual image of the sample and at least a second individual image of the sample, the first individual image corresponding to a first sample region, and the second individual image corresponding to a second sample region that is different from the first sample region and overlaps with the first sample region in an overlap region, wherein during the generating the first individual image, the illumination light is scanned by the scanner point by point or line by line over the first sample region, and during the generating the second individual image, the illumination light is scanned by the scanner point by point or line by line over the second sample region, and
   a controller configured to control the illumination unit in such a way that, during the generating each of the first individual image and the second individual image, an intensity of the illumination light is reduced when the illumination light is scanned over the overlap region as compared to when the illumination light is scanned over a remaining portion of the first sample region and a remaining portion of the second sample region.

2. The device as recited in claim 1, wherein the illumination unit comprises a light source for generating the illumination light and an attenuation unit disposed downstream of the light source and configured to reduce an intensity of the illumination light, wherein the controller is configured to control the attenuation unit so that the intensity of the illumination light is reduced when the illumination light is scanned over the overlap region as compared to when the illumination light is scanned over the remaining portion of the first sample region and the remaining portion of the second sample region.

3. The device as recited in claim 2, wherein the attenuation unit comprises one of: an acoustic-optic tunable filter, an acoustic-optic modulator, an electric-optic modulator, or a Pockels cell.

4. The device as recited in claim 1, wherein the illumination unit comprises a light source for generating the illumination light, the light source being controllable to control the intensity of the illumination light.

5. The device as recited in claim 1, wherein the illumination unit is configured to generate a light-sheet-type illumination light distribution in the sample, wherein the light-sheet-type illumination light distribution is dynamically generated.

6. The device according to claim 1, further comprising a motorized microscope stage configured to hold the sample, wherein the controller is configured to move the microscope stage for generating the first individual image in such a way that the first sample region is in a field of view of the image capture unit, and to move the microscope stage for generating the second individual image in such a way that the second sample region is in the field of view of the image capture unit.

7. The device as recited in claim 1, wherein the illumination unit is configured to generate the illumination light for exciting fluorophores present in the sample.

8. The device as recited in claim 1, wherein the image capture unit comprises a sensor and an optical system configured to direct the illumination light to the sample and to direct detection light emanating from the sample to the sensor.

9. The device as recited in claim 1, wherein the image capture unit comprises an optical system, and wherein the optical system comprises at least one microscope objective pointing at the sample and constitutes a microscope.

10. The device as recited in claim 1, wherein the image capture unit is configured to generate at least a third individual image of the sample, the third individual image corresponding to a third sample region that is different from the first sample region and the second sample region and overlaps with the first sample region and the second sample region in a further overlap region, and wherein the controller is configured to control the illumination unit in such a way that, during the generating each of the first individual image, the second individual image, and the third individual image, the intensity of the illumination light is further reduced when the illumination light is scanned over the further overlap region as compared to when the illumination light is scanned over the overlap region.

11. The device as recited in claim 1, wherein the controller is configured to process first image data corresponding to the first individual image and second image data corresponding to the second individual image to generate the composite image of the sample, wherein the composite image covers the first sample region and the second sample region.

12. A method for generating a composite image of a sample, the method comprising:
  generating illumination light for illuminating the sample using an illumination unit,
  generating a first individual image of the sample corresponding to a first sample region by scanning the illumination light point by point or line by line over the first sample region,
  generating at least a second individual image of the sample corresponding to a second sample region by scanning the illumination light point by point or line by line over the second sample region, wherein the second sample region is different from the first sample region and overlaps with the first sample region in an overlap region, and
  controlling the illumination unit so that, during the generating each of the first individual image and the second individual image, an intensity of the illumination light is reduced when the illumination light is scanned over the overlap region as compared to when the illumination light is scanned over a remaining portion of the first sample region and a remaining portion of the second sample region.

13. The method as recited in claim 12, further comprising determining an intensity value of the intensity of the illumination light with which the illumination light is scanned over the overlap region, such that an intensity of detection light that emanates from the sample during exposure to the illumination light with the intensity value is half as great as during exposure to the illumination light with a normal intensity value with which the illumination light is scanned over the remaining portion of the first sample region and the remaining portion of the second sample region.

* * * * *